United States Patent
Marchante

(10) Patent No.: US 10,723,062 B2
(45) Date of Patent: Jul. 28, 2020

(54) STRETCHING DEVICE TO STRETCH A FILM MADE OF SYNTHETIC MATERIAL AT LEAST IN THE TRANSVERSE DIRECTION

(71) Applicant: Carolina Marchante, Le Bourget du Lac (FR)

(72) Inventor: Carolina Marchante, Le Bourget du Lac (FR)

(73) Assignee: Carolina Marchante, Le Bourget du Lac (FR)

( * ) Notice: Subject to any disclaimer, the term of this patent is extended or adjusted under 35 U.S.C. 154(b) by 91 days.

(21) Appl. No.: 15/801,149

(22) Filed: Nov. 1, 2017

(65) Prior Publication Data
US 2018/0257293 A1    Sep. 13, 2018

(30) Foreign Application Priority Data

Mar. 10, 2017 (FR) ...................................... 17 51956

(51) Int. Cl.
| | |
|---|---|
| *B29C 55/08* | (2006.01) |
| *B29C 55/20* | (2006.01) |
| *B29C 55/14* | (2006.01) |
| *B29C 55/16* | (2006.01) |
| *B29K 105/00* | (2006.01) |

(52) U.S. Cl.
CPC ............ *B29C 55/08* (2013.01); *B29C 55/143* (2013.01); *B29C 55/16* (2013.01); *B29C 55/165* (2013.01); *B29C 55/20* (2013.01); *B29K 2105/256* (2013.01)

(58) Field of Classification Search
CPC ........ B29C 55/20; B29C 55/16; B29C 55/165
See application file for complete search history.

(56) References Cited

U.S. PATENT DOCUMENTS

| | | | | |
|---|---|---|---|---|
| 3,004,284 A | * | 10/1961 | Limbach ............... | B29C 55/165 26/72 |
| 4,807,336 A | * | 2/1989 | Yoshimura .............. | B29C 55/20 26/71 |
| 2006/0115548 A1 | * | 6/2006 | Marchante Moreno ..................... | B29C 55/165 425/66 |

FOREIGN PATENT DOCUMENTS

| | | |
|---|---|---|
| FR | 2922810 A1 | 5/2009 |
| JP | 2012121259 A | 6/2012 |
| JP | 2013031938 A | 2/2013 |

OTHER PUBLICATIONS

French Search Report for Application No. FA837320 (2 pages).

* cited by examiner

*Primary Examiner* — Leith S Shafi
*Assistant Examiner* — Nicholas J Chidiac
(74) *Attorney, Agent, or Firm* — Cantor Colburn LLP

(57) ABSTRACT

This stretching device comprises a guide rail, first clamps of a first type and second clamps of a second type each intended to grip the same longitudinal edge of a film and alternately disposed along the guide rail, and an endless chain connected to the first and second clamps and configured to drive the first and second clamps along the guide rail, the endless chain being deformable between a first state and a second state in which the first and second clamps are respectively disposed close to or distant from each other. Each first clamp and each second clamp respectively include a primary guide roller and a secondary guide roller configured to cooperate with the guide rail, the first and second clamps being configured such that when the endless chain is in the first state, the primary guide roller of each first clamp and the secondary guide roller of each second clamp adjacent to said first clamp overlap at least partially.

20 Claims, 6 Drawing Sheets

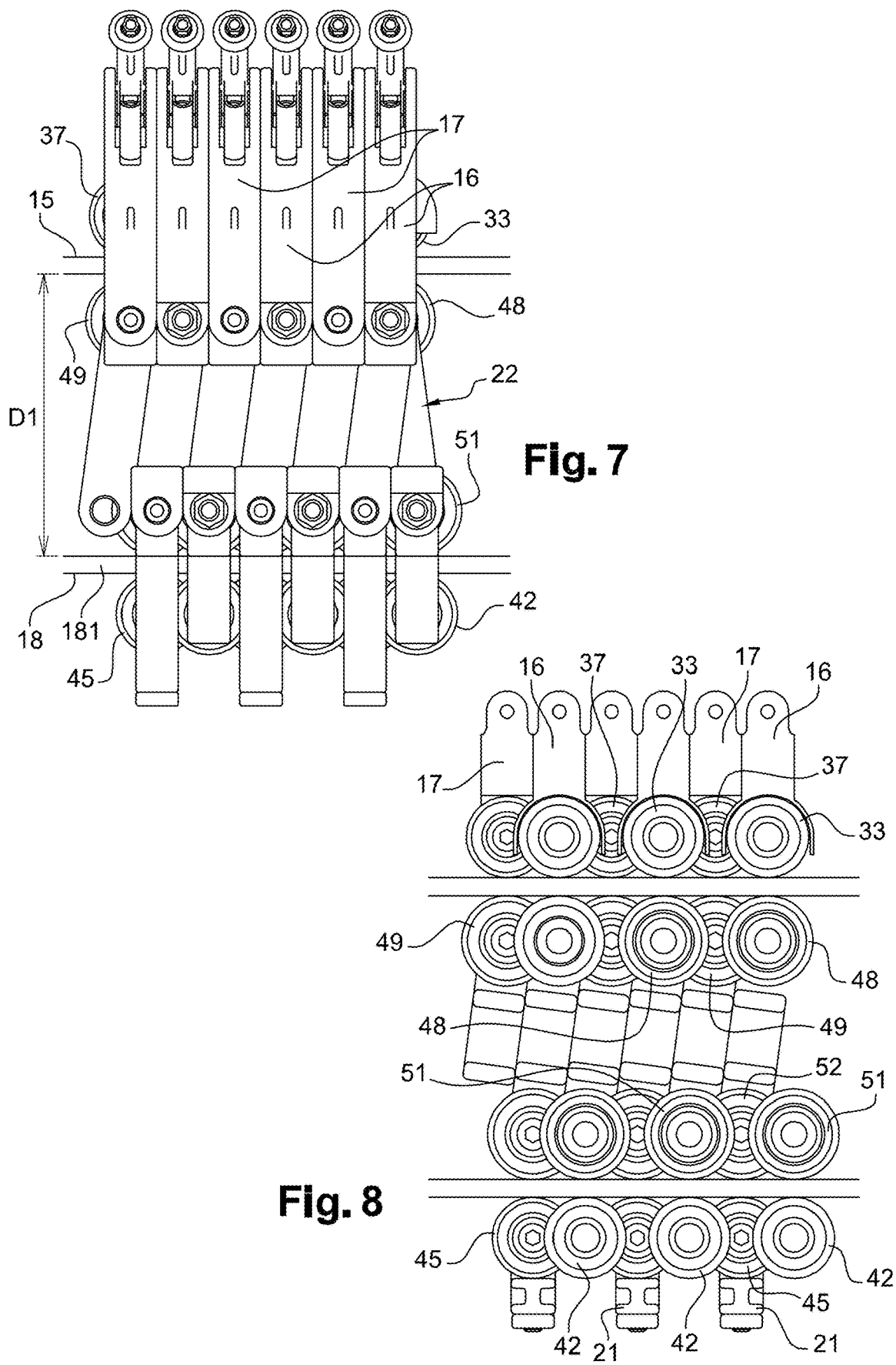

STRETCHING DEVICE TO STRETCH A FILM MADE OF SYNTHETIC MATERIAL AT LEAST IN THE TRANSVERSE DIRECTION

CROSS REFERENCE TO RELATED APPLICATIONS

This application claims the benefit of French Patent Application No. 17/51956, filed on Mar. 10, 2017, the entire contents of which are incorporated herein by reference thereto.

TECHNICAL FIELD

The present invention concerns a stretching device to stretch a film made of synthetic material at least in the transverse direction.

BACKGROUND

During the manufacture of a film made of synthetic material, such as a film made of polypropylene, polyester or composed of any other thermoplastic material, the film, after its formation, passes successively through a longitudinal stretching step and a transverse stretching step.

A stretching system, configured to stretch a film made of synthetic material in the transverse direction, includes, in a known manner, a furnace allowing regulating the temperature of the film during its stretching in the transverse direction, and two stretching devices disposed on either side of the film. Each stretching device includes more particularly:
- a guide rail extending at least partially in the furnace and including a first guide surface turned toward the film and a second guide surface opposite to the first guide surface,
- a plurality of clamps each intended to grip the same longitudinal edge of the film, the clamps being configured to be guided in translation by the respective guide rail,
- a retaining rail extending along the respective guide rail, the retaining rail including a bearing surface turned toward the respective guide rail and a retaining surface opposite to the bearing surface,
- a plurality of guide elements configured to be guided in translation by the retaining rail, and
- an endless chain including a succession of links hingedly mounted relative to each other and first and second articulating elements connecting in an articulated manner the links, each clamp being hingedly mounted on a respective first articulating element and each guide element being hingedly mounted on a respective second articulating element, the endless chain being configured to drive the respective clamps along the respective guide rail, and to drive the respective guide elements along the respective retaining rail, the endless chain being further deformable between a first state in which the clamps are disposed proximate to each other, and a second state in which the clamps are distant from each other.

Advantageously, each guide element includes running rollers configured to cooperate respectively with the bearing surface and the retaining surface of the respective retaining rail, and each clamp also includes running rollers configured to cooperate respectively with the first guide surface and second guide surface of the respective guide rail. These arrangements ensure a guiding of the guide elements and of the clamps on the respective rails.

Such a stretching system is adapted to high production speeds, including when this stretching system is configured to simultaneously ensure a stretching of the film in the transverse direction and a stretching of the film in the longitudinal direction.

However, due to the considerable width of the clamps, the distance between two adjacent gripping areas of the film may turn out to be very large, particularly when each endless chain is in the second state and the clamps are distant from each other. For example, with clamps each having a width of 50 mm and a longitudinal stretching of a ratio of 8, the distance between adjacent gripping areas of the film will be 400 mm. Such a distance between clamps has the consequence that the thickness of the film is not homogeneous at the longitudinal edges of the film, which requires cutting the film at the longitudinal edges and therefore generates significant losses of products.

A solution to overcome this drawbacks consists in reducing the width of each clamp. For example, with clamps each having a width of 25 mm and a longitudinal stretching of a ratio of 8, the distance between adjacent gripping areas of the film will be only 200 mm. Thus, the use of clamps of small width allows obtaining films having a better homogeneity in thickness and this with little waste.

However, such a solution involves the use of smaller diameter running rollers in order to avoid a conflict between the running rollers of two adjacent clamps when the chain is in the first state, and therefore requires substantially reducing the displacement speed of the endless chain. This results in a substantial reduction in production speeds.

SUMMARY OF THE INVENTION

The present invention aims to overcome all or part of these drawbacks.

The technical problem at the basis of the invention therefore consists in providing a stretching device which allows the use of clamps of small width, while being adapted to high production speeds.

To this end, the present invention concerns a stretching device to stretch a film made of synthetic material at least in the transverse direction, comprising:
- a guide rail including a first guide surface intended to be turned toward the film and a second guide surface opposite to the first guide surface,
- a plurality of first clamps of a first type and a plurality of second clamps of a second type each intended to grip a same longitudinal edge of the film, the first and second clamps being alternately disposed along the guide rail and being configured to be guided by the guide rail,
- an endless chain connected to the first and second clamps and configured to drive the first and second clamps along the guide rail, the endless chain being deformable between a first state in which the first and second clamps are disposed proximate to each other and a second state in which the first and second clamps are distant from each other, each first clamp includes a primary guide roller configured to cooperate with the first guide surface of the guide rail and each second clamp includes a secondary guide roller configured to cooperate with the first guide surface of the guide rail, the primary guide roller of each first clamp being shifted vertically with respect to the secondary guide roller of each second clamp adjacent to said first clamp, the first and second clamps being configured such that when the endless chain is in the first state, the primary guide roller of each first clamp and the secondary guide roller of each second clamp adjacent to said first clamp overlap at least partially.

In other words, the first and second clamps are configured such that when the chain is in the first state, an orthogonal projection of the primary guide roller of each first clamp in a horizontal reference plane and an orthogonal projection of the secondary guide roller of each second clamp adjacent to said first clamp in the horizontal reference plane include at least one common portion.

Such a configuration of the first and second clamps, and particularly the fact that the primary and secondary guide rollers of the first and second clamps overlap at least partially when the endless chain is in the first state, authorizes the use of clamps of small width and guide rollers of large diameters, and this without any risk of conflict between guide rollers. Consequently, the stretching device according to the invention is adapted to high production speeds (and in particular a chain speed up to 500 m/min), while greatly limiting losses of products.

Furthermore, because of the use of guide rollers of large diameters, the stretching device according to the invention is also adapted to great stretching forces, in particular for stretching thick films.

In addition, the use of guide rollers of large diameters allows reducing the frictional force between the guide rollers and the guide rail, and therefore reducing the wear rate of said guide rollers, while ensuring good guiding of the first and second clamps relative to the guide rail.

For example, the stretching device according to the invention allows the use of first and second clamps having widths, for example, comprise between 25 and 50 mm, and primary and secondary guide rollers having diameters up to about 52 mm or more if necessary.

The stretching device may further have one or more of the following features, considered separately or in combination.

According to an embodiment of the invention, the primary guide rollers extend substantially in a first extension plane and the secondary guide rollers extend substantially in a second extension plane substantially parallel to the first extension plane and shifted with respect to the first extension plane.

According to an embodiment of the invention, each second clamp includes at least one receiving recess, the primary guide roller of each first clamp extending at least partially in the receiving recess of each adjacent second clamp when the endless chain is in the first state.

According to an embodiment of the invention, each first clamp includes a clamp body, the primary guide roller of each first clamp projecting laterally on either side of the clamp body of said first clamp.

According to an embodiment of the invention, each second clamp includes a clamp body, the secondary guide roller of each second clamp projecting laterally on either side of the clamp body of said second clamp.

According to an embodiment of the invention, the endless chain includes at least:
  first links of a first type and second links of a second type hingedly mounted relative to each other, and
  first articulating elements and second articulating elements alternately disposed along the endless chain and around which the first and second links are hingedly mounted, the first and second clamps being mounted, preferably articulated, on the first articulating elements.

According to an embodiment of the invention, the first and second articulating elements extend substantially vertically.

According to an embodiment of the invention, the primary guide roller of each first clamp has a substantially vertical axis of rotation.

According to an embodiment of the invention, the secondary guide roller of each second clamp has a substantially vertical axis of rotation.

According to an embodiment of the invention, each first clamp includes a primary running roller configured to roll on an upper surface of the guide rail.

According to an embodiment of the invention, each second clamp includes a secondary running roller configured to roll on the upper surface of the guide rail.

According to an embodiment of the invention, the primary running roller of each first clamp has a substantially horizontal axis of rotation.

According to an embodiment of the invention, the secondary running roller of each second clamp has a substantially horizontal axis of rotation.

According to an embodiment of the invention, each first articulating element, on which a first clamp is mounted, carries a bearing roller configured to cooperate with the second guide surface of the guide rail.

According to an embodiment of the invention, each second link includes a bearing roller configured to bear against the second guide surface of the guide rail.

According to an embodiment of the invention, the bearing roller carried by each first articulating element, on which a first clamp is mounted, has a substantially vertical axis of rotation.

According to an embodiment of the invention, the bearing roller of each second link has a substantially vertical axis of rotation.

According to an embodiment of the invention, the bearing roller carried by each first articulating element, on which a first clamp is mounted, is shifted vertically with respect to the bearing roller of each second link adjacent to said first articulating element, the endless chain being configured such that when the endless chain is in the first state, the bearing roller carried by each first articulating element on which a first clamp is mounted and the bearing roller of each second link adjacent to said first articulating element overlap at least partially.

In other words, the endless chain is configured such that when the chain is in the first state, an orthogonal projection of the bearing roller carried by each first articulating element on which a first clamp is mounted in a horizontal reference plane and an orthogonal projection of the bearing roller of each adjacent second link in the horizontal reference plane include at least one common portion.

According to an embodiment of the invention, the bearing roller carried by each second link extends substantially opposite a first articulating element on which a second clamp is mounted. Advantageously, the endless chain is configured such that, when the chain is in the first state, the bearing roller carried by each first articulating element, on which a first clamp is mounted, extends at least partially between the bearing roller of an adjacent second link and the clamp body of a second clamp mounted on the first articulating element located substantially opposite the bearing roller of said second link.

According to an embodiment of the invention, the bearing roller carried by each second link extends substantially coaxially with the first articulating element located substantially opposite said bearing roller.

According to an embodiment of the invention, the stretching device further includes:

a retaining rail extending along the guide rail, the retaining rail including a bearing surface turned toward the guide rail and a retaining surface opposite to the bearing surface, and a plurality of first guide elements and a plurality of second guide elements alternately disposed along the retaining rail and configured to be guided by the retaining rail, the first and second guide elements being mounted, preferably articulated, on the second articulating elements of the endless chain and being configured to be driven by the endless chain along the retaining rail.

According to an embodiment of the invention, the retaining rail includes a first rail portion extending substantially parallel to the guide rail and spaced apart from the guide rail by a first distance, and a second rail portion extending substantially parallel to the guide rail and spaced apart from the guide rail by a second distance different from the first distance, the second rail portion being located downstream of the first rail portion, and the retaining rail is configured such that a displacement of the first and second guide elements from the first rail portion to the second rail portion results in a deformation of the endless chain between the first and second states.

According to an embodiment of the invention, the retaining rail includes a transition portion connecting the first rail portion and the second rail portion. Advantageously, the transition portion forms an inclined ramp.

According to an embodiment of the invention, the second distance is smaller than the first distance, and the retaining rail is configured such that a displacement of the first and second guide elements from the first rail portion to the second rail portion results in a deformation of the endless chain from the first state to the second state so as to induce longitudinal stretching of the film.

According to an embodiment of the invention, each first guide element includes a primary retaining roller configured to cooperate with the retaining surface of the retaining rail and each second guide element includes a secondary retaining roller configured to cooperate with the retaining surface of the retaining rail, the primary retaining roller of each first guide element being shifted vertically with respect to the secondary retaining roller of each second guide element adjacent to said first guide element, the first and second guide elements being configured such that when the chain is in the first state, the primary retaining roller of each first guide element and the secondary retaining roller of each second guide element adjacent to said first guide element overlap at least in partially.

In other words, the endless chain is configured such that when the chain is in the first state, an orthogonal projection of the primary retaining roller of each first guide element in a horizontal reference plane and an orthogonal projection of the secondary retaining roller of each second guide element adjacent to said first guide element in the horizontal reference plane include at least one common portion.

According to an embodiment of the invention, each primary retaining roller is arranged to be retained by the guide rail so as to apply a retaining force on the respective second articulating element, and each secondary retaining roller is arranged to be retained by the guide rail so as to apply a retaining force on the respective second articulating element.

According to an embodiment of the invention, the transition portion is configured to decrease the retaining force applied on each second articulating element in order to deform the endless chain in the second state.

According to an embodiment of the invention, the transition portion is configured to increase the retaining force applied on each second articulating element in order to deform the endless chain in the first state.

According to an embodiment of the invention, the primary retaining roller of each first guide element has a substantially vertical axis of rotation.

According to an embodiment of the invention, the secondary retaining roller of each second guide element has a substantially vertical axis of rotation.

According to an embodiment of the invention, each first guide element includes a guide body, the primary retaining roller of each first guide element projecting laterally on either side of the guide body of said first guide element.

According to an embodiment of the invention, each second guide element includes a guide body, the secondary retaining roller of each second guide element projecting laterally on either side of the guide body of said second guide element.

According to an embodiment of the invention, each first guide element includes a primary running roller configured to roll on an upper surface of the retaining rail. Advantageously, the primary running roller of each first guide element has a substantially horizontal axis of rotation.

According to an embodiment of the invention, each second guide element includes a secondary running roller configured to roll on the upper surface of the retaining rail. Advantageously, the secondary running roller of each second guide element has a substantially horizontal axis of rotation.

According to an embodiment of the invention, the endless chain further includes third links of a third type, each third link including a bearing roller configured to cooperate with the bearing surface of the retaining rail.

According to an embodiment of the invention, each second articulating element, on which a first guide element is mounted, carries a bearing roller configured to cooperate with the bearing surface of the retaining rail.

According to an embodiment of the invention, the bearing roller carried by each second articulating element, on which a first guide element is mounted, is shifted vertically with respect to the bearing roller of each third link adjacent to said second articulating element, the endless chain being configured such that when the chain is in the first state, the bearing roller carried by each second articulating element on which a first guide element is mounted and the bearing roller of each third link adjacent to said second articulating element overlap at least partially.

In other words, the endless chain is configured such that when the chain is in the first state, an orthogonal projection of the bearing roller carried by each second articulating element on which a first guide element is mounted in a horizontal reference plane and an orthogonal projection of the bearing roller of each third link adjacent to said second articulating element in the horizontal reference plane include at least one common portion.

According to an embodiment of the invention, the bearing roller carried by each third link extends substantially opposite a second articulating element on which a second guide element is mounted. Advantageously, the endless chain is configured such that when the chain is in the first state, the bearing roller carried by each second articulating element, on which a first guide element is mounted, extends at least partly between the bearing roller of an adjacent third link and the guide body of a second guide element mounted on the second articulating element located substantially opposite the bearing roller of said third link.

According to an embodiment of the invention, the bearing roller carried by each third link extends substantially coaxially with the second articulating element located substantially opposite said bearing roller.

The present invention further concerns a stretching system to stretch a film made of synthetic material at least in the transverse direction, comprising two stretching devices according to the invention disposed on either side of the film, the first and second clamps of one of the stretching devices being arranged to grip a first longitudinal edge of the film and the first and second clamps of the other of the stretching devices being arranged to grip a second longitudinal edge of the film.

According to an embodiment of the invention, the stretching system includes a furnace, and the guide rails of the two stretching devices extend at least partially in the furnace.

According to an embodiment of the invention, the guide rails of the two stretching devices diverge relative to each other in a first area of the stretching system.

According to an embodiment of the invention, the guide rails of the two stretching devices extend substantially parallel to each other in a second area of the stretching system located downstream of the first area of the stretching system.

According to an embodiment of the invention, the second rail portion of each retaining rail is located at least partially in the first area of the stretching system. These arrangements allow ensuring longitudinal stretching or longitudinal relaxation of the film simultaneously with transverse stretching of the film.

According to an embodiment of the invention, the transition portion of each retaining rail is located at least partially in the second area of the stretching system. These arrangements allow ensuring longitudinal stretching or longitudinal relaxation of the film after transverse stretching of the film.

BRIEF DESCRIPTION OF THE DRAWINGS

In any case, the invention will be better understood from the following description with reference to the appended schematic drawings representing, as a non-limiting example, an embodiment of this stretching system.

FIG. 7 is a partial top view of the stretching device of FIG. 2.

FIG. 8 is a partial sectional view in a horizontal plane of the stretching device of FIG. 2, showing the arrangement of different rollers belonging to the stretching device of FIG. 2.

DETAILED DESCRIPTION OF THE INVENTION

Figure 1:
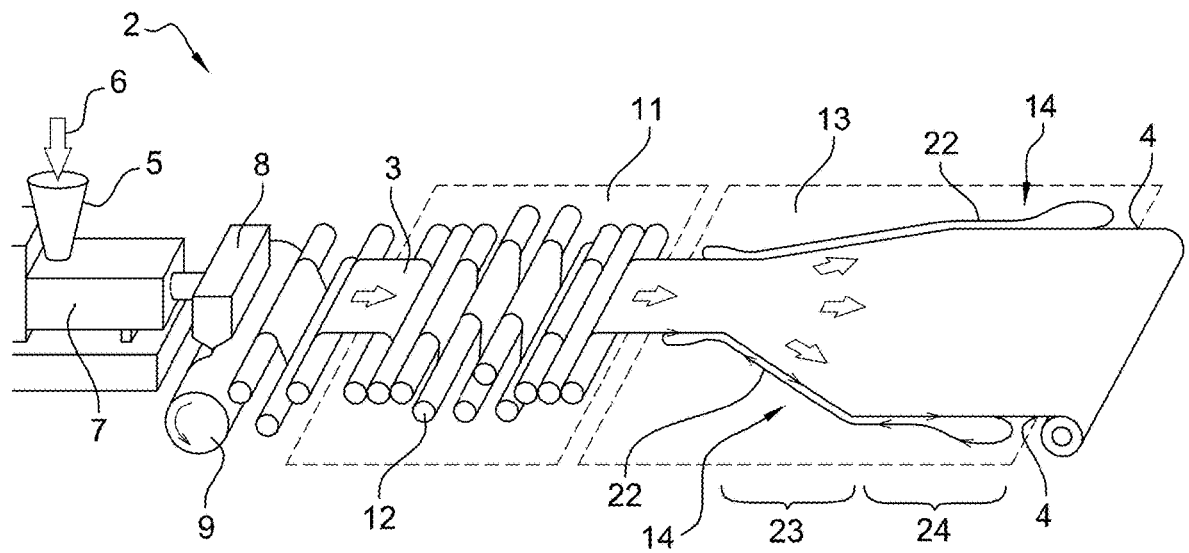
FIG. 1 is an overall view of an installation for producing a film made of synthetic material.

FIG. 1 represents a production installation 2 for the production of a film 3 made of synthetic material having two substantially parallel longitudinal edges 4.

The production installation 2 includes successively:
a synthetic material 6 supply system 5,
an extruder 7 allowing a controlled supply of synthetic material 6,
a system for melting 8 the synthetic material 6,
a casting drum 9 on which the film 3 is formed by flow of the molten synthetic material 6,
a longitudinal stretching system 11 to stretch the film 3 in the longitudinal direction, the longitudinal stretching system 11 including speed differential rolls 12 to carry and stretch the film 3, and
a stretching system 13 to stretch the film 3 at least in the transverse direction.

The stretching system 13 includes a furnace (not represented in the figures) allowing regulating the temperature of the film 3 during its stretching in the transverse direction, and two stretching devices 14 disposed on either side of the film 3.

Figure 2:
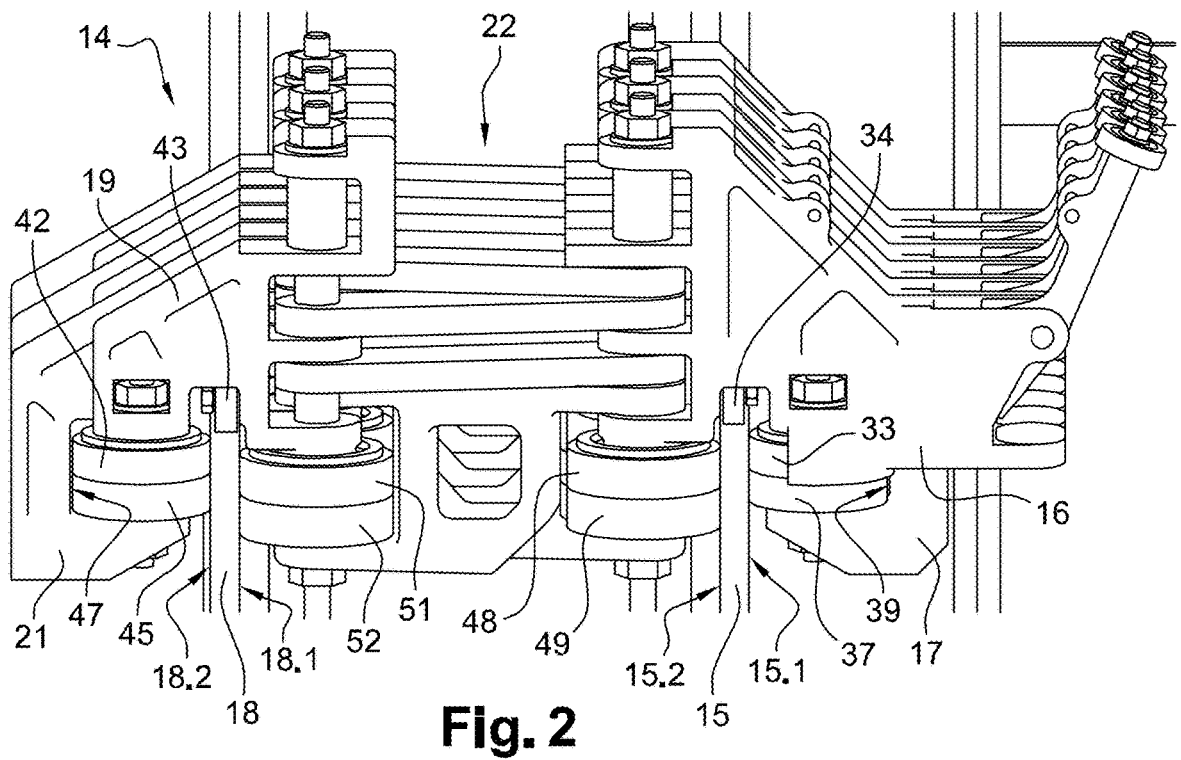
FIGS. 2 to 4 are partial perspective views of a stretching device belonging to the production installation of FIG. 1.
Figure 3:
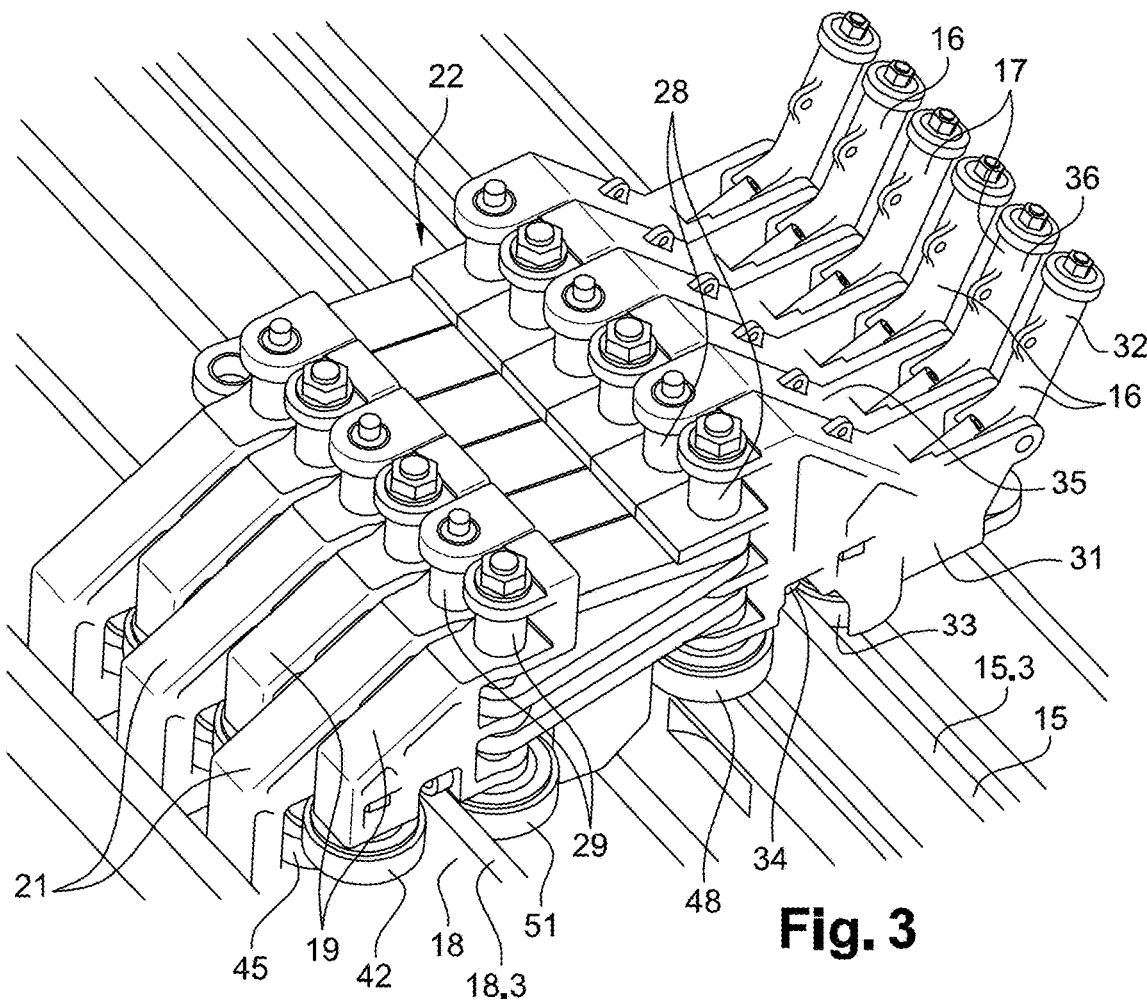
Figure 4:
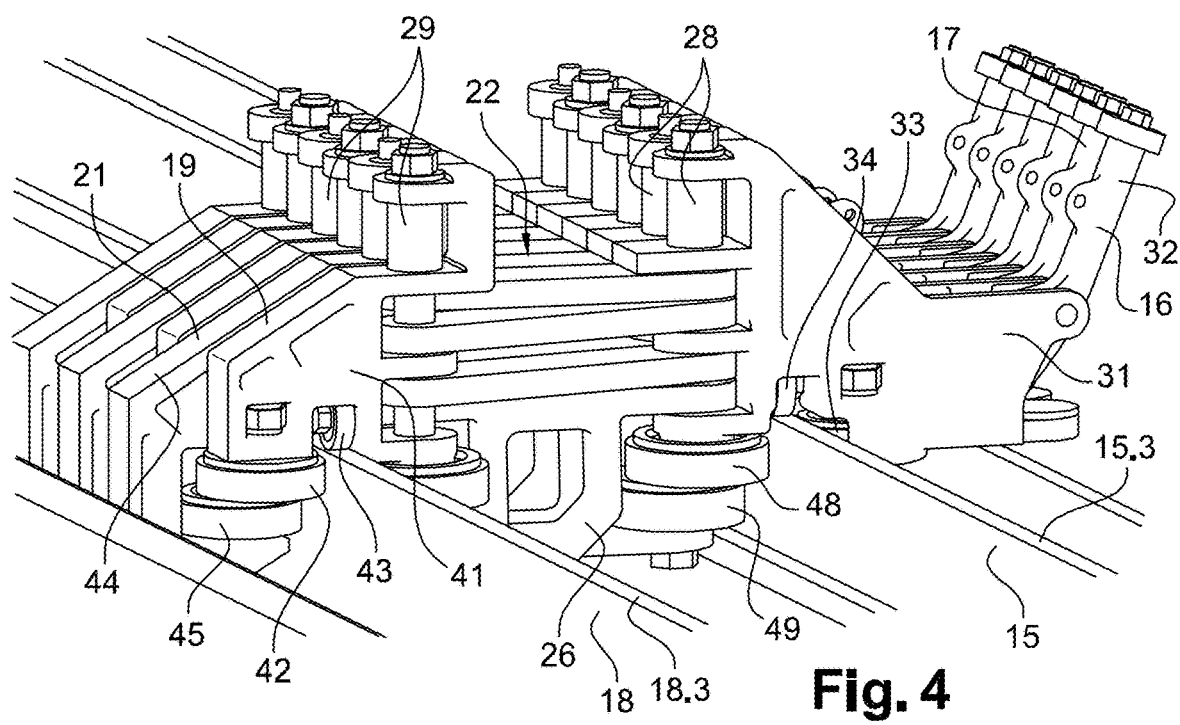
Figure 11:
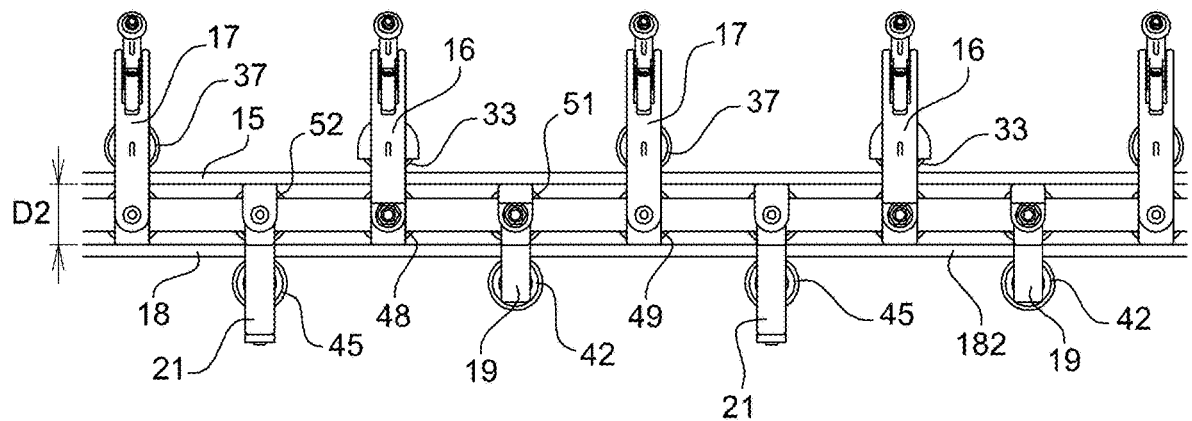
FIG. 11 is a partial top view of the stretching device of FIG. 2, showing the first and second clamps distant from each other.
Figure 12:
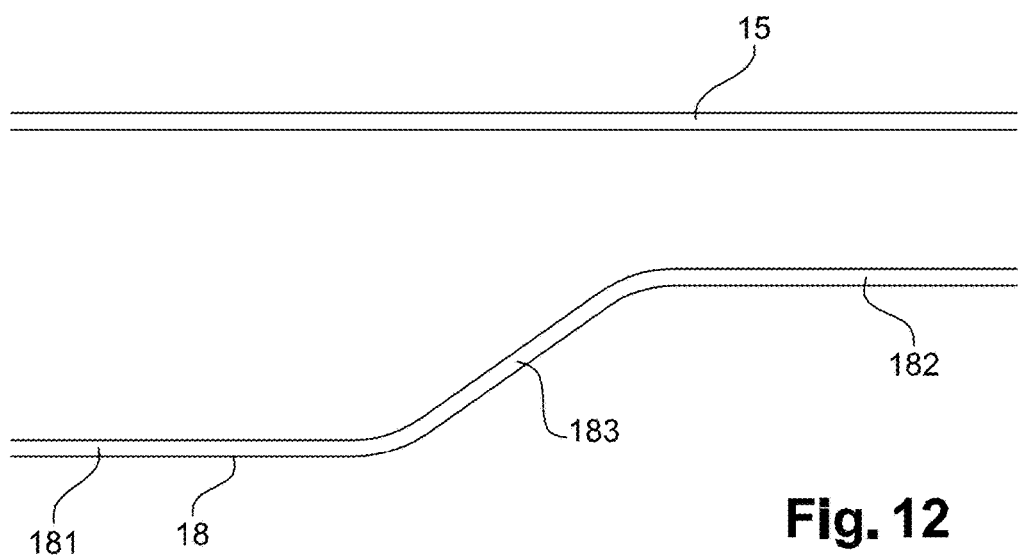
FIG. 12 is a partial top view of a guide rail and a retaining rail belonging to the stretching device of FIG. 2.

As shown in particular in FIGS. 2 to 4, each stretching device 14 includes more particularly:
a guide rail 15 extending at least partially in the furnace and including a first guide surface 15.1 turned toward the film 3 and a second guide surface 15.2 opposite to the first guide surface 15.1,
a plurality of first clamps 16 of a first type and a plurality of second clamps 17 of a second type each intended to grip a corresponding longitudinal edge 4 of the film 3, the first and second clamps 16, 17 being alternately disposed along the respective guide rail 15 and being configured to be guided in translation by the respective guide rail 15,
a retaining rail 18 extending along the respective guide rail 15, the retaining rail 18 including a bearing surface 18.1 turned toward the respective guide rail 15 and a retaining surface 18.2 opposite to the bearing surface 18.1,
a plurality of first guide elements 19 and a plurality of second guide elements 21 alternately disposed along the retaining rail 18 and configured to be guided in translation by the retaining rail 18, and
an endless chain 22 configured to drive the respective first and second clamps 16, 17 along the respective guide rail 15, and to drive the respective first and second guide elements 19, 21 along the respective retaining rail 15, the endless chain 22 being deformable between a first state (see FIGS. 3 and 7) in which the first and second clamps 16, 17 are disposed close proximity to each other, and a second state (see FIGS. 9 and 11) in which the first and second clamps 16, 17 are distant from each other.

As can be seen from FIG. 1, the guide rails 15 of the two stretching devices 14 diverge relative to each other in a first area 23 of the stretching system 13 located in the furnace, and extend substantially parallel to each other in a second area 24 of the stretching system 13 located downstream of the first area 23 of the stretching system 13, and which can be located either in or out of the furnace. According to the embodiment represented in the figures, each guide rail 15 has a substantially rectangular section.

Figure 9:
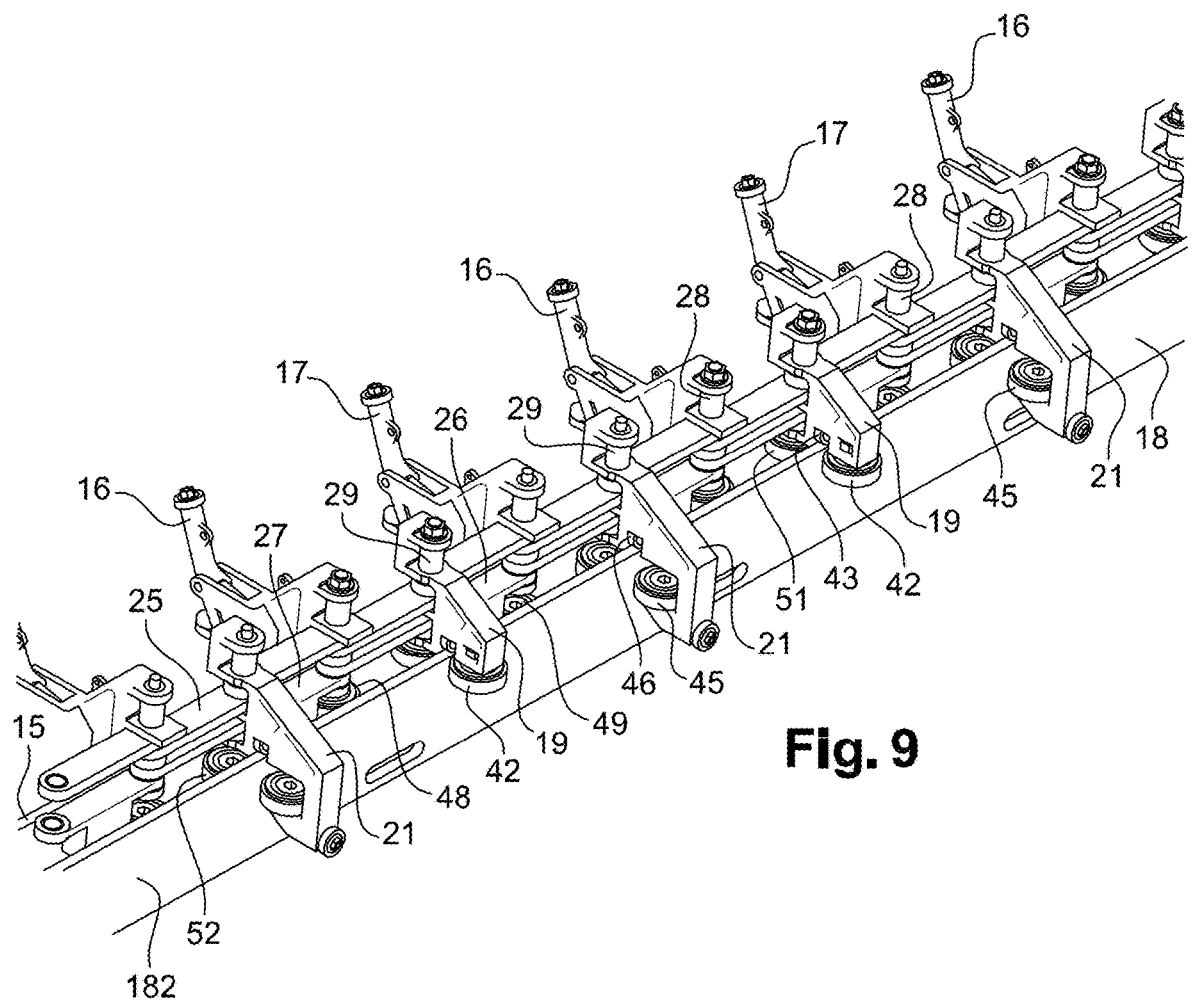
FIG. 9 is a perspective view of the stretching device of FIG. 2, showing first and second clamps belonging to the stretching device distant from each other.
Figure 10:
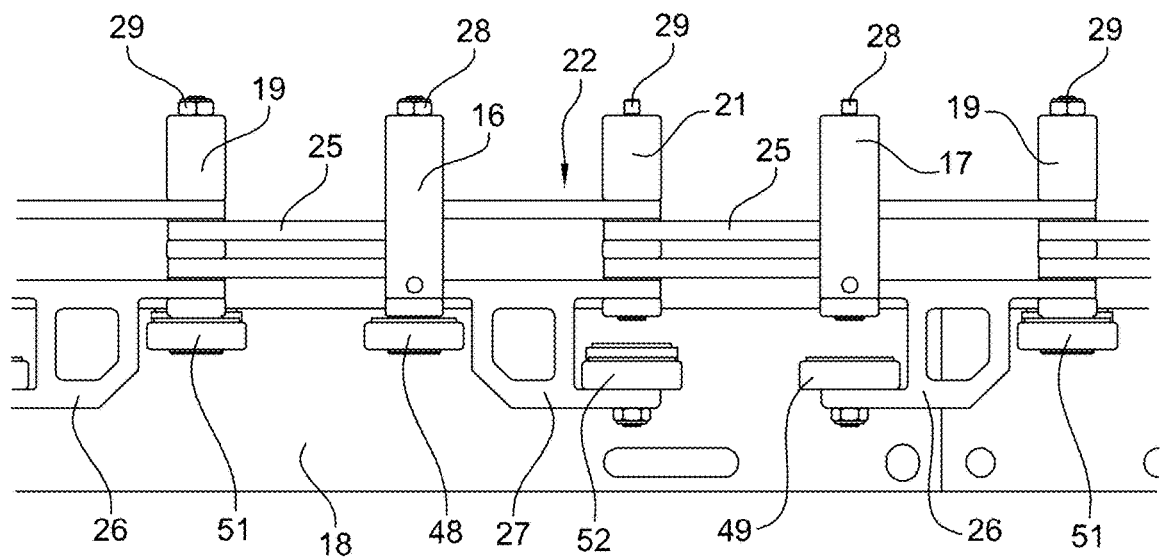
FIG. 10 is a partial longitudinal sectional view of the stretching device of FIG. 2, showing more particularly different links of an endless chain belonging to the stretching device.

As shown in particular in FIGS. 9 and 10, each endless chain 22 includes first links 25 of a first type, second links 26 of a second type and third links 27 of a third type hingedly mounted relative to each other, and furthermore first articulating elements 28 and second articulating elements 29 alternately disposed along the endless chain 22 and around which the first, second and third links 25, 26, 27 are hingedly mounted.

As shown in FIGS. 3 and 4, each first clamp 16 includes a clamp body 31 hingedly mounted on a respective first articulating element 28, and a gripping finger 32 pivotally mounted on the clamp body 31 and configured to grip the film 3. Each first clamp 16 further includes a primary guide roller 33 having a substantially vertical axis of rotation and configured to cooperate with the first guide surface 15.1 of the guide rail 15, and a primary running roller 34 having a substantially horizontal axis of rotation and configured to roll on an upper surface 15.3 of the guide rail 15. The primary guide roller 33 of each first clamp 16 projects laterally on either side of the respective clamp body 31.

Each second clamp 17 includes a clamp body 35 hingedly mounted on a respective first articulating element 28, and a gripping finger 36 pivotally mounted on the clamp body 35 and configured to grip the film 3. Each second clamp 17 further includes a secondary guide roller 37 having a substantially vertical axis of rotation and configured to cooperate with the first guide surface 15.1 of the guide rail 15, and a secondary running roller (not shown in the figures) having a substantially horizontal axis of rotation and configured to roll on the upper surface 15.3 of the guide rail 15. The secondary guide roller 37 of each second clamp 17 projects laterally on either side of the respective clamp body 35.

As shown in FIG. 8, the primary guide roller 33 of each first clamp 16 is shifted vertically with respect to the secondary guide roller 37 of each second clamp 17 adjacent to said first clamp 16. Advantageously, the primary guide rollers 33 extend substantially in a first extension plane and the secondary guide rollers 37 extend substantially in a second extension plane substantially parallel to the first extension plane and shifted with respect to the first extension plane.

The first and second clamps 16, 17 are more particularly configured such that when the endless chain 22 is in the first state, the primary guide roller 33 of each first clamp 16 and the secondary guide roller 35 of each second clamp 17 adjacent to said first clamp 16 overlap at least partially, and for example at least at their periphery. Advantageously, each second clamp 17 includes a receiving recess 39, and the primary guide roller 33 of each first clamp 16 is configured to extend at least partially in the receiving recess 39 of each adjacent second clamp 17 when the endless chain 22 is in the first state.

Figure 5:
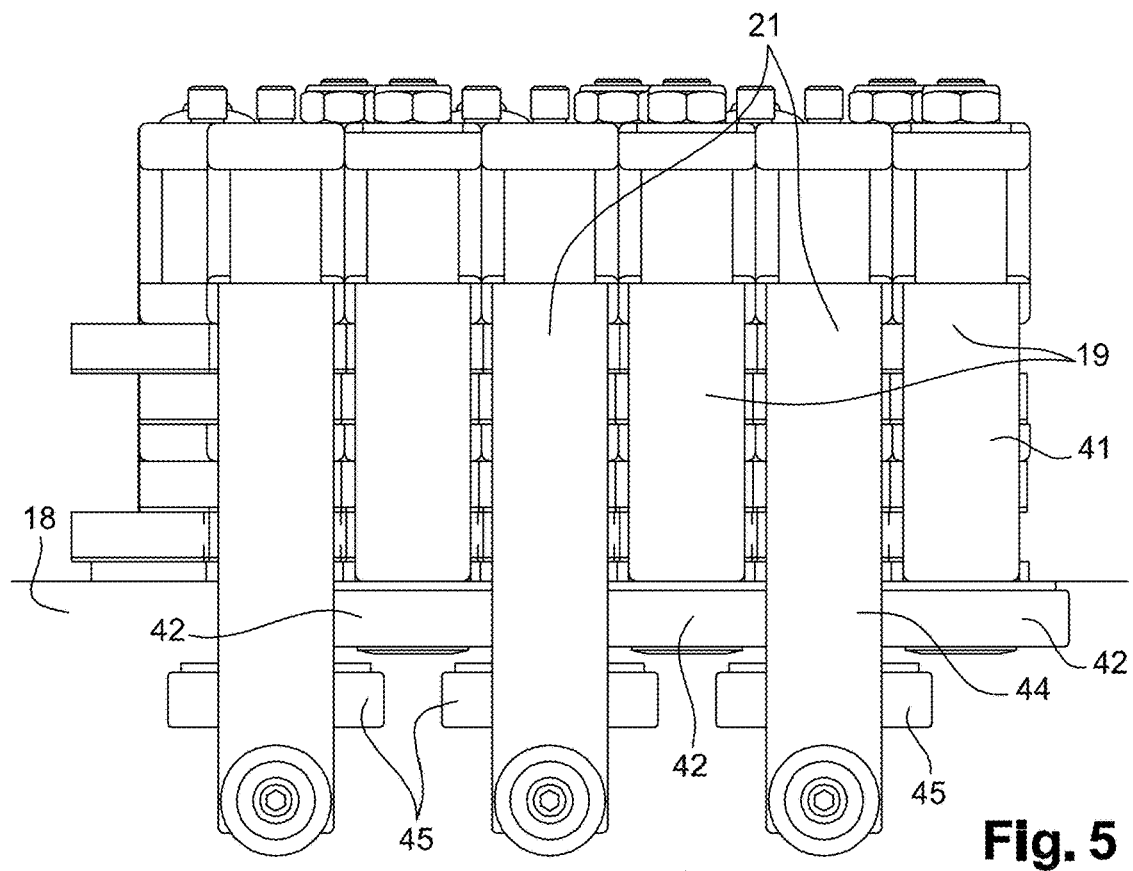
FIG. 5 is a side view of the stretching device of FIG. 2, showing more particularly first and second guide elements belonging to the stretching device.

As shown in FIGS. 4 and 5, each first guide element 19 includes a guide body 41 hingedly mounted on a respective second articulating element 29, and a primary retaining roller 42 having a substantially vertical axis of rotation and configured to cooperate with the retaining surface 18.2 of the retaining rail 18. The primary retaining roller 42 of each first guide element 19 projects laterally on either side of the respective guide body 41. Each primary retaining roller 42 is arranged to be retained by the guide rail 18 so as to apply a retaining force on the respective second articulating element 29.

Each first guide element 19 further includes a primary running roller 43 having a substantially horizontal axis of rotation and configured to roll on an upper surface 18.3 of the retaining rail 18.

Each second guide element 21 includes a guide body 44 hingedly mounted on a respective second articulating element 29, and a secondary retaining roller 45 having a substantially vertical axis of rotation and configured to cooperate with the retaining surface 18.2 of the retaining rail 18. Each secondary retaining roller 45 is arranged to be retained by the guide rail 18 so as to apply a retaining force on the respective second articulating element 29. The secondary retaining roller 45 of each second guide element 21 advantageously projects laterally on either side of the respective guide body 44.

Each second guide element 21 further includes a secondary running roller 46 having a substantially horizontal axis of rotation and configured to roll on an upper surface 18.3 of the retaining rail 18.

As shown in FIG. 5, the primary retaining roller 42 of each first guide element 19 is shifted vertically with respect to the secondary retaining roller 45 of each second guide element 21 adjacent to said first guide element 19. Advantageously, the primary retaining rollers 42 extend substantially in a primary extension plane and the secondary retaining rollers 45 extend substantially in a secondary extension plane substantially parallel to the primary extension plane and shifted with respect to the primary extension plane.

The first and second guide elements 19, 21 are more particularly configured such that when the endless chain 22 is in the first state, the primary retaining roller 42 of each first guide element 19 and the secondary retaining roller 45 of each second guide element 21 adjacent to said first guide element 19 overlap at least partially, and for example at least at their periphery. Advantageously, each second guide element 21 includes a receiving recess 47, and the primary retaining roller 42 of each first guide element 19 is configured to extend at least partially in the receiving recess 47 of each adjacent second guide element 21 when the endless chain 22 is in the first state.

As shown in FIG. 4, each first articulating element 28, on which a first clamp 16 is mounted, carries a bearing roller 48 having a substantially vertical axis of rotation and configured to cooperate with the second guide surface 15.2 of the guide rail 15, and each second link 26 includes a bearing roller 49 having a substantially vertical axis of rotation and configured to bear against the second guide surface 15.2 of the guide rail 15. The bearing roller 49 of each second link 26 advantageously extends opposite a first articulating element 28 on which a second clamp 17 is mounted, and preferably, coaxially with said first articulating element 28.

The bearing roller 48 carried by each first articulating element 28, on which a first clamp 16 is mounted, is shifted vertically with respect to the bearing roller 49 of each second link 26 adjacent to said first articulating element 28. Advantageously, the bearing rollers 48 carried by first articulating elements 28 extend substantially in a first plane and the bearing rollers 49 of the second links 26 extend substantially in a second plane substantially parallel to the first plane and shifted with respect to the first plane.

The endless chain 22 is configured such that when the endless chain 22 is in the first state, the bearing roller 48 carried by each first articulating element 28 on which a first clamp 16 is mounted and the bearing roller 49 of each second link 26 adjacent to said first articulating element 28 overlap at least partially, and for example at least at their periphery. Advantageously, when the endless chain 22 is in the first state, the bearing roller 48 carried by each first articulating element 28 extends partially between the bearing roller 49 of an adjacent second link 26 and the clamp body 35 of a second clamp 17 mounted on the first articulating element 28 located substantially opposite the bearing roller 49 of said adjacent second link 26.

As shown in FIG. 10, each second articulating element 29, on which a first guide element 19 is mounted, carries a bearing roller 51 having a substantially vertical axis of rotation and configured to cooperate with the bearing surface 18.1 of the retaining rail 18, and each third link 27 includes a bearing roller 52 having a substantially vertical axis of rotation and configured to cooperate with the bearing surface 18.1 of the retaining rail 18. The bearing roller 52 of each third link 27 advantageously extends opposite a second articulating element 29 on which a second guide element 21 is mounted, and preferably, coaxially with said second articulating element 29.

The bearing roller 51 carried by each second articulating element 29, on which a first guide element 19 is mounted, is shifted vertically with respect to the bearing roller 52 of each third link 27 adjacent to said second articulating element 29. Advantageously, the bearing rollers 51 carried by second articulating elements 29 extend substantially in a first plane and the bearing rollers 52 of the third links 27 extend substantially in a second plane substantially parallel to the first plane and shifted with respect to the first plane.

Figure 6:
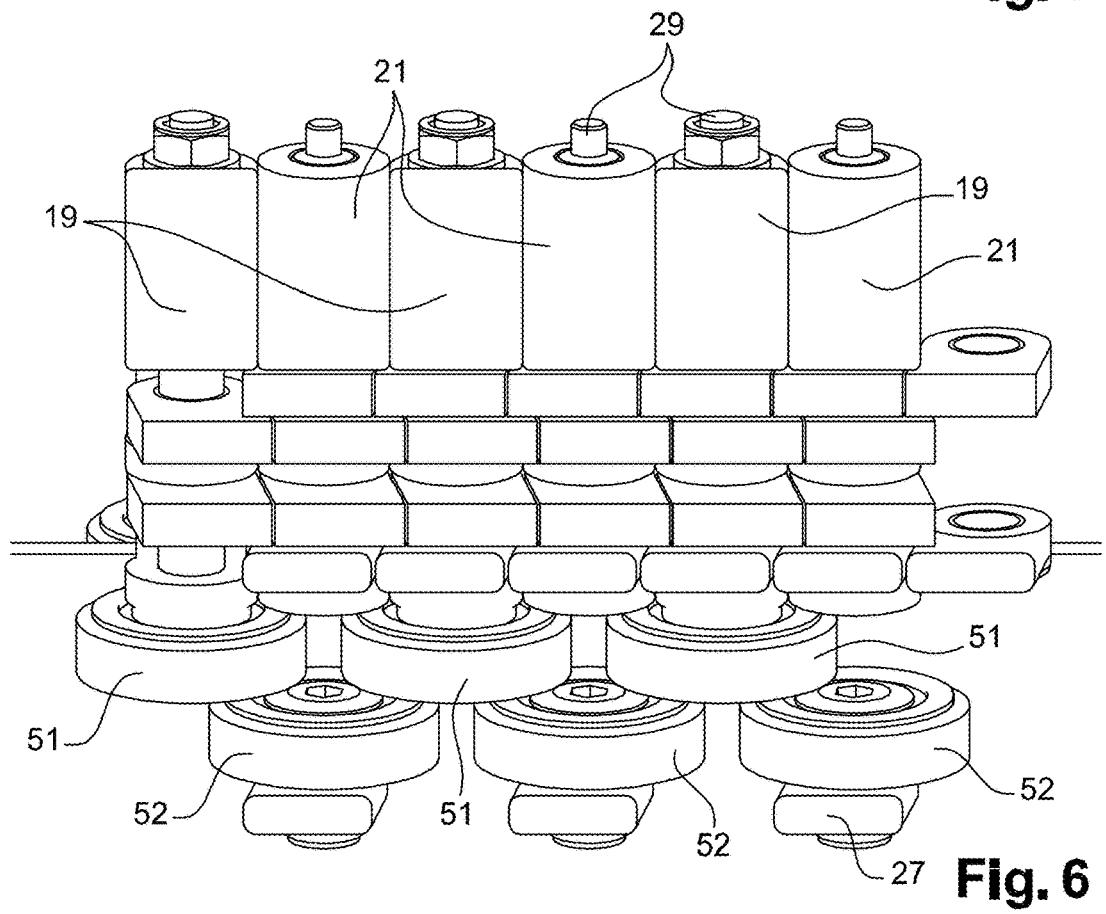
FIG. 6 is a partial longitudinal sectional view of the stretching device of FIG. 2.

As shown in FIG. 6, the endless chain 22 is configured such that when the endless chain 22 is in the first state, the bearing roller 51 carried by each second articulating element 29 on which a first guide element is mounted 19 and the bearing roller 52 of each third link 27 adjacent to said second articulating element 29 overlap at least partially, and for example at least at their periphery. Advantageously, when the endless chain 22 is in the first state, the bearing roller 51 carried by each second articulating element 29 extends partially between the bearing roller 52 of an adjacent third link 27 and the guide body 44 of the second guide element 21 mounted on the second articulating element 29 located substantially opposite the bearing roller 52 of said adjacent third link 27.

As shown in FIGS. 8 and 9, each retaining rail 18 includes a first rail portion 181 extending substantially parallel to the respective guide rail 15 and spaced apart from the respective guide rail 15 by a first distance D1, and a second rail portion 182 located downstream of the first rail portion 181 and extending substantially parallel to the respective guide rail 15, the second rail portion 182 being spaced apart from the respective guide rail 15 by a second distance D2 different from the first distance D1. Each retaining rail 18 further includes a transition portion 183 connecting the respective first and second rail portions 181, 182. Advantageously, each transition portion 183 forms an inclined ramp.

Each retaining rail 18 is more particularly configured such that a displacement of the first and second guide elements 19, 21 from the first rail portion 181 to the second rail portion 182 results in a deformation of the endless chain 22 between the first and second states.

Indeed, each endless chain is maintained, at the first articulating elements 28, by the respective first and second clamps 16, 17 on the respective guide rail 15, and, at the second articulating elements 29, by the first and second guide elements 19, 21 on the respective retaining rail 18. The deviation or the rapprochement between each guide rail 15 and the respective retaining rail allows, by varying the distance between the first articulating elements provided with clamps and the second articulating elements provided with guide elements, modifying the folding of the respective endless chain and therefore modifying the chain pitch and the spacing between the first and second clamps 16, 17.

Particularly, the first, second and third links 25, 26, 27 of each endless chain 2 extend transversely to the respective guide rail 15 when said endless chain 22 is in the first state, and extend substantially parallel to the respective guide rail 15 when said endless chain 22 is in the second state.

Advantageously, the transition portion 183 of each retaining rail 18 is located in the first area 23 of the stretching system 13. These arrangements allow ensuring deformation of the endless chain 22 between the first and second states in the first area 23 of the stretching system 13, and therefore ensuring longitudinal stretching or longitudinal relaxation of the film 3 simultaneously with transverse stretching of the latter.

The operation of the stretching system 13 will now be described by considering that the second distance D2 separating each second rail portion 182 and the respective guide rail 15 is smaller than the first distance D1 separating each first rail portion 181 and the respective guide rail 15.

During the entry of the film 3 into the stretching system 13, the longitudinal edges 4 of the film 3 are gripped respectively by the first and second clamps 16, 17 of each stretching device 14. The first and second clamps 16, 17, driven by the endless chains 22, convey the film 3 along the guide rails 15. In the first area 23 of the stretching system 13, the film 3, having reached an adequate stretching temperature, is stretched in the transverse direction due to the divergence of the guide rails 15, and therefore to the continuous increase in the spacing between the first and second clamps 16, 17 of one of the stretching devices 14 and the first and second clamps 16, 17 of the other of the stretching devices 14.

When the first and second guide elements 19, 21 of each stretching device 14 reach the transition portion 183 and the second rail portion 182 of the respective retaining rail 18, the bearing rollers 52, 51 carried by each third link 27 and by each second articulating element 29, on which a first guide element 19 is mounted, are urged toward the guide rail 15 by the transition portion 183 and the second rail portion 182 of the respective retaining rail 18, which induces a displacement of the second articulating elements 29 toward the respective guide rail 15. This displacement of the second articulating elements 29 has the effect of increasing the chain pitch and of moving the first and second clamps 16, 17 away from each stretching device 14. Thus, these arrangements allow ensuring longitudinal stretching of the film 3 simultaneously with its transverse stretching.

The operation of the stretching system 13 will now be described by considering that the second distance D2 separating each second rail portion 182 and the respective guide rail 15 is greater than the first distance D1 separating each first rail portion 181 and the respective guide rail 15.

When the first and second guide elements 19, 21 of each stretching device 14 reach the transition portion 183 and the second rail portion 182 of the respective retaining rail 18, the retaining rollers 42, 45 carried by each of the first and second guide elements 19, 21 are urged away from the guide rail 15 by the transition portion 183 and the second rail portion 182 of the respective retaining rail 18, which induces a displacement of the second articulating elements 29 away from the respective guide rail 15. This displacement of the second articulating elements 29 has the effect of reducing the chain pitch and bringing the first and second clamps 16, 17 closer to each stretching device 14. Thus, these arrangements allow ensuring longitudinal relaxation of the film 3 simultaneously with its transverse stretching.

According to a variant of the invention, the guide rails 15 could have, in the second area 24 of the stretching system 13, a portion on which the guide rails 15 converge toward each other so as to allow a transverse relaxation of the film simultaneously with its longitudinal relaxation.

It goes without saying that the invention is not limited to the sole embodiment of this stretching system, described hereinabove as example, but it comprises all variants thereof.

What is claimed is:

1. A stretching device to stretch a film made of synthetic material at least in the transverse direction, comprising:
    a guide rail including a first guide surface intended to be turned toward the film and a second guide surface opposite to the first guide surface;
    a plurality of first clamps of a first type and a plurality of second clamps of a second type, the first clamps of the first type being different from the second clamps of the second type, the first and second clamps being configured to grip a same longitudinal edge of the film, the first and second clamps being alternately disposed along the guide rail and being configured to be guided by the guide rail;
    an endless chain connected to the first and second clamps and configured to drive the first and second clamps along the guide rail, the endless chain being deformable between a first state in which the first and second clamps are disposed in close proximity to each other, and a second state in which the first and second clamps are distant from each other;
    each first clamp includes a primary guide roller configured to cooperate with the first guide surface of the guide rail and each second clamp includes a secondary guide roller configured to cooperate with the first guide surface of the guide rail, the primary guide roller of each first clamp being shifted vertically with respect to the secondary guide roller of each second clamp adjacent to said first clamp, the first and second clamps being configured such that when the endless chain is in the first state, the primary guide roller of each first clamp and the secondary guide roller of each second clamp adjacent to said first clamp overlap at least partially;
    each first clamp includes a first clamp body and a first gripping finger mounted on the first clamp body and configured to grip the film, the primary guide roller of each first clamp projecting laterally on both sides of the first clamp body of said first clamp; and
    each second clamp includes a second clamp body and a second gripping finger mounted on the second clamp body and configured to grip the film, the secondary guide roller of each second clamp projecting laterally on both sides of the second clamp body of said second clamp.

2. A stretching system to stretch a film made of synthetic material at least in the transverse direction, comprising two stretching devices according to claim 1 disposed on either side of the film, the first and second clamps of one of the stretching devices being arranged to grip a first longitudinal edge of the film and the first and second clamps of the other stretching device being arranged to grip a second longitudinal edge of the film.

3. The stretching device according to claim 1, wherein each second clamp includes at least one receiving recess, the primary guide roller of each first clamp extending at least partially in the receiving recess of each adjacent second clamp when the endless chain is in the first state.

4. The stretching device according to claim 3, wherein the endless chain includes at least:
    first links of a first type and second links of a second type hingedly mounted relative to each other, and
    first articulating elements and second articulating elements alternately disposed along the endless chain and around which the first and second links are hingedly mounted, the first and second clamps being mounted on the first articulating elements.

5. The stretching device according to claim 4, wherein each first articulating element, on which a first clamp is mounted, carries a bearing roller configured to cooperate with the second guide surface of the guide rail.

6. The stretching device according to claim 5, wherein each second link includes a bearing roller configured to bear against the second guide surface of the guide rail.

7. The stretching device according to claim 6, wherein the bearing roller carried by each first articulating element on which a first clamp is mounted, is shifted vertically with respect to the bearing roller of each second link adjacent to said first articulating element, the endless chain being configured such that when the endless chain is in the first state, the bearing roller carried by each first articulating element on which a first clamp is mounted and the bearing roller of each second link adjacent to said first articulating element overlap at least partially.

8. The stretching device according to claim 1, wherein the endless chain includes at least:
    first links of a first type and second links of a second type hingedly mounted relative to each other, and
    first articulating elements and second articulating elements alternately disposed along the endless chain and around which the first and second links are hingedly mounted, the first and second clamps being mounted on the first articulating elements.

9. The stretching device according to claim 8, wherein each first articulating element, on which a first clamp is mounted, carries a bearing roller configured to cooperate with the second guide surface of the guide rail.

10. The stretching device according to claim 9, wherein each second link includes a bearing roller configured to bear against the second guide surface of the guide rail.

11. The stretching device according to claim 10, wherein the bearing roller carried by each first articulating element on which a first clamp is mounted, is shifted vertically with respect to the bearing roller of each second link adjacent to said first articulating element, the endless chain being configured such that when the endless chain is in the first state, the bearing roller carried by each first articulating element on which a first clamp is mounted and the bearing roller of each second link adjacent to said first articulating element overlap at least partially.

12. The stretching device according to claim 11, wherein the bearing roller of each second link is located opposite a first articulating element on which a second clamp is mounted.

13. The stretching device according to claim 8, which further includes:
    a retaining rail extending along the guide rail, the retaining rail including a bearing surface turned toward the guide rail and a retaining surface opposite to the bearing surface, and a plurality of first guide elements and a plurality of second guide elements alternately disposed along the retaining rail and configured to be guided by the retaining rail, the first and second guide elements being mounted on the second articulating elements of the endless chain and being configured to be driven by the endless chain along the retaining rail.

14. The stretching device according to claim 13, wherein each first guide element includes a primary retaining roller configured to cooperate with the retaining surface of the retaining rail and each second guide element includes a secondary retaining roller configured to cooperate with the retaining surface of the retaining rail, the primary retaining roller of each first guide element being shifted vertically with respect to the secondary retaining roller of each second guide element adjacent to said first guide element, the first and second guide elements being configured such that when the endless chain is in the first state, the primary retaining roller of each first guide element and the secondary retaining roller of each second guide element adjacent to said first guide element overlap at least partially.

15. The stretching device according to claim 13, wherein the retaining rail includes a first rail portion extending substantially parallel to the guide rail and spaced apart from the guide rail by a first distance, and a second rail portion extending substantially parallel to the guide rail and spaced apart from the guide rail by a second distance different from the first distance, the second rail portion being located downstream of the first rail portion, and in which the retaining rail is configured such that a displacement of the first and second guide elements from the first rail portion to the second rail portion results in a deformation of the endless chain between the first and second states.

16. The stretching device according to claim 15, wherein the second distance is smaller than the first distance, and the retaining rail is configured such that a displacement of the first and second guide elements from the first rail portion to the second rail portion results in a deformation of the endless chain from the first state to the second state so as to induce a longitudinal stretching of the film.

17. The stretching device according to claim 15, wherein the second distance is greater than the first distance, and the retaining rail is configured such that a displacement of the first and second guide elements from the first rail portion to the second rail portion results in a deformation of the endless chain from the second state to the first state so as to induce a longitudinal relaxation of the film.

18. The stretching device according to claim 13, wherein the endless chain further includes third links of a third type, each third link including a bearing roller configured to cooperate with the bearing surface of the retaining rail.

19. The stretching device according to claim 18, wherein each second articulating element, on which a first guide element is mounted, carries a bearing roller configured to cooperate with the bearing surface of the retaining rail.

20. The stretching device according to claim 19, wherein the bearing roller carried by each second articulating element, on which a first guide element is mounted, is shifted vertically with respect to the bearing roller of each third link adjacent to said second articulating element, the endless chain being configured such that, when the endless chain is in the first state, the bearing roller carried by each second articulating element on which a first guide element is mounted and the bearing roller of each third link adjacent to said second articulating element overlap at least partially.

* * * * *